Nov. 19, 1957 J. H. MORROW 2,813,630
MATERIAL TRAP
Original Filed Dec. 15, 1951
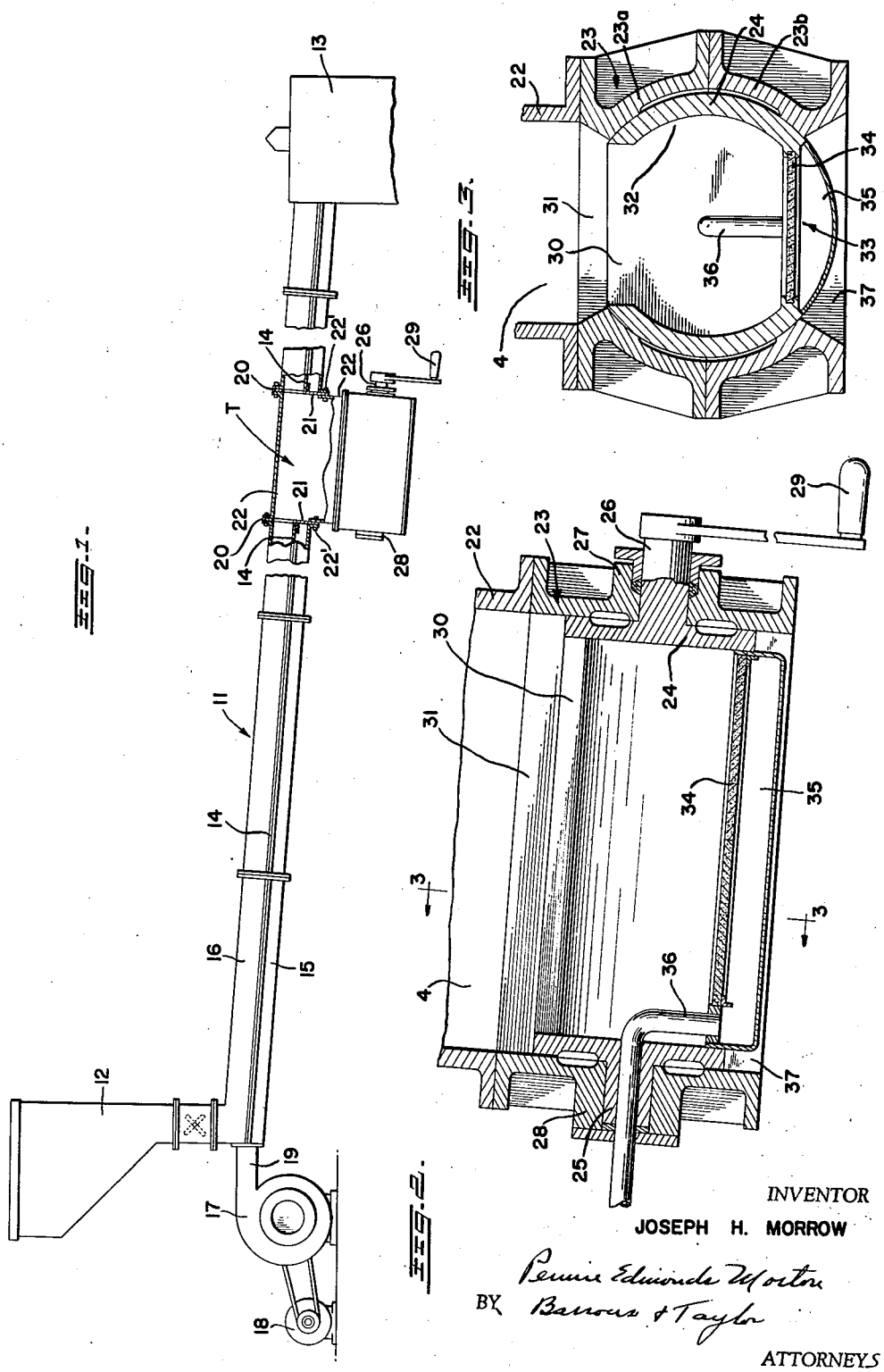
INVENTOR
JOSEPH H. MORROW
ATTORNEYS

2,813,630

MATERIAL TRAP

Joseph H. Morrow, Hokendauqua, Pa., assignor to Fuller Company, a corporation of Pennsylvania Original application December 15, 1951, Serial No. 261,874, now Patent No. 2,769,544, dated November 6, 1956. Divided and this application May 7, 1956, Serial No. 583,141

9 Claims. (Cl. 209—474)

This invention relates to apparatus for removing undesired substances from fine dry materials, and more particularly, the invention has to do with the separation by gravity of foreign objects from a moving stream of pulverulent material, and their collection in a fixed bed of fluidized material.

In the processing and handling of many pulverulent materials, undesired objects and particles of greater density than the pulverulent material are frequently introduced and must be removed before a subsequent processing or handling operation can be carried out. For example, in grinding a chemical, rock, or mineral, there is usually introduced into the mill stream a variety of metal objects, such as broken pieces of grinding media, mill liners, screen wire, and other metallic items resulting from wear and breakage, all of which are commonly referred to as "tramp iron." Undesired oversize particles are also frequently present in the pulverulent material being discharged from a mill and must be separated. In other manufacturing operations, such as conveying and elevating dry materials, tramp iron also enters the material stream due to wear and breakage of equipment.

Magnetic separators associated with a moving stream of material in a spout, or in a conveyor, have long been used successfully to remove tramp iron, but such devices are restricted to the separation of magnetically susceptible materials. Tramp iron and also oversize particles are commonly removed from dry materials by vibrating screens. In the screening of large tonnages of fine dry materials, and particularly abrasive substances, however, operating and maintenance costs are high, and there is always present the chance that a broken or worn screen will pass a substantial quantity of foreign material before the defect is discovered and repaired, the repair in many instances involving costly shutdowns of major plant operations.

The passage of air through a distribution means into a body of dry material, either with or without mechanical vibration, has previously been employed to cause a classification into components according to particle size or specific gravity. Such air classification methods have been successful in certain industries with a limited number of materials which are in general coarser in size than those to which my invention is applicable. The efficiency of classification decreases rapidly as the average particle size decreases from a "crusher product size" through the "granular" or "sand size" down to pulverulent materials. In the case of pulverulent materials, the amount of classification obtained is negligible, the result of diffusing relatively small volumes of air therethrough being largely the production of a fluidized bed, more fully described below.

The present invention is accordingly directly to a novel and simple apparatus for removing, from a moving stream of pulverulent material, foreign or undesired substances of greater density than the material, by the use of a fluidized bed through which the substantially greater density material settles. The apparatus of my invention has the further advantage of not in itself being able to introduce contamination due to wear or breakage and of not permitting foreign materials already in the stream to pass because of defects due to wear.

The separation of foreign substances of greater density from a stream of moving material is accomplished in accordance with my invention by maintaining a fixed bed of the material, diffusing air through the bed to fluidize the material therein, and causing the moving stream to travel over the top of and in contact with the top of the fluidized bed. The undesired foreign material having a density higher than the particles in the moving stream, either due to a higher specific gravity, or to a substantially larger particle size, settles from the moving stream under the influence of gravity through the fixed bed of material of reduced bulk density, so that it can be removed at the bottom of the bed.

The apparatus of my invention, referred to as a material trap, includes a chamber for containing a column of fluidized pulverulent material and adapted to be placed below an opening through the bottom of a trough or like structure, along which the pulverulent material is being advanced. A gas permeable medium forms the bottom of the chamber and serves as a means for diffusing air or other suitable gas into the pulverulent material to maintain it in a fluidized condition, and a plenum chamber is disposed below the porous medium. The gas permeable medium forms at least a part of a rotary discharge valve so that when it is desired to remove an accumulation of the undesired foreign material from the bottom of the material trap, it is only necessary to rotate the valve to its discharge position and let the foreign material drop out.

In the preferred form of the invention the discharge valve is of hollow cylindrical form having an opening at one side and the gas permeable medium at the diametrically opposite side. When the valve is in its closed position, the open side is at the top and the gas permeable medium is at the bottom so that the cylindrical valve actually forms the bottom of the material trap. The valve is rotatably mounted in a valve body having openings at the top and bottom, opposite the opening and gas permeable bottom of the rotary discharge valve. With such an arrangement the valve may be rotated through an angle of 180° to discharge accumulated foreign material with a minimum loss of material from the fixed bed of the material.

It is well known that the introduction of a gas, in appropriate quantities, into a pulverulent material by diffusion will result in fluidization of the mass, and the gas-solids mixture will acquire many of the properties of a liquid. Individual particles will be separated from each other, the bulk volume considerably expanded and thus the bulk density reduced, and the internal particle to particle friction reduced. To maintain the fluidized condition in a column the gas must have sufficient velocity to support the particles, but not sufficient to entrain any substantial amount of solid as the gas emerges from the upper surface of the bed.

My material trap includes the use of such a fluidized bed of reduced bulk density, and the heavier tramp iron or oversize particles sink readily through the bed, a movement which would not be possible in an unaerated bed due to the internal friction and close packing of the fine particles.

As previously stated, the gas emerging from the upper surface of the fixed bed is directed through the moving stream of material producing a fluent effect similar to that in the fixed bed. As a result, the tramp iron and oversize particles settle out of the stream and into the fluidized bed.

The apparatus of my invention may be applied to the separation of foreign material from a variety of pulverulent substances among which may be mentioned for purposes of illustration: cement and cement raw materials, gypsum, soda ash, fly ash, barytes, bentonite, flour, hydrated lime, ground ores, alumina, catalysts, silica, phosphates, talc, resins, and detergents. Generally speaking, any of the above materials, to be effectively fluidized in my trap, should be finer than 20 mesh and preferably finer than 65 mesh, while at the same time containing a substantial proportion of minus 100 mesh, and with some materials a substantial amount of minus 200 mesh.

The moving stream of pulverulent material from which foreign material is separated, in accordance with my invention, may be present in a variety of conveyors. Typical examples are: the air activated gravity conveyor referred to below, screw conveyors, flight conveyors, drag chains and Redlers, and vibrating conveyors.

A clearer understanding of my invention may be had by reference to the drawings in which:

Fig. 1 is a schematic elevation of an air activated gravity conveyor utilizing my material trap;

Fig. 2 is a sectional view of the material trap; and

Fig. 3 is a transverse section along line 3—3 of Fig. 2.

Referring to the drawings, Fig. 1 discloses a typical schematic arrangement of an air activated gravity material conveyor, a detailed description of which is found in U. S. Patents Nos. 2,527,455 and 2,527,488, utilizing my material trap. I have shown a conveying duct 11 delivering material from a hopper 12 to a receiver 13. A gas permeable medium 14 provides a material conveying surface which at the same time divides the conveyor into two portions, a conveying air plenum chamber 15 and a material conveying duct 16. The air is supplied by a fan 17 driven by a motor 18 through an appropriate connection 19 to the plenum chamber 15.

In the normal operation of the conveying duct 11, material capable of being fluidized is discharged from the hopper 12 onto the gas permeable medium 14, wherein it is fluidized by air passing through the gas permeable medium from the plenum chamber 15 and flows by gravity to the receiver 13 through the material conveying duct 16.

The material trap T of the invention is incorporated into the conveying system, as generally disclosed in Fig. 1, by inserting an expansion joint 20 into the conveying duct 11 at the desired location of the trap. The expansion joint 20 provides an unobstructed opening for the material conveying duct 16, but forms closures 21 for the conveying air plenum chamber 15. The housing 22 of the material trap is connected to the expansion joint 20 by means of flanges and bolts 22' thereby forming a material tight structure integral with the conveying system wherein the material confining chamber 4 of the material trap is in direct communication with the material conveying duct 16.

The lower portion of the housing 22 has outwardly-extending flanges which are bolted or otherwise secured in material-tight arrangement to corresponding flanges of a valve body 23. The valve body is formed of upper and lower sections 23$^a$ and 23$^b$ bolted together, and together defining a generally cylindrical container having a space in which is mounted a rotatable valve 24. The valve 24 is provided at each end with shafts 25 and 26 positioned in bearing housings 27 and 28 of the valve body 23. The shaft 26 is provided with a handle 29 for rotating the valve 24.

Valve 24 is in the form of a generally cylindrical receptacle having an opening 30 which, when the valve is in its closed position, is at the top. The valve body section 23$^a$ has an opening 31 at the top coterminus with the opening 30 of the rotary cylindrical valve so that the chamber 32 within the valve forms a continuation of the space within the housing 22.

An aeration unit 33, comprising a gas permeable medium 34 and a plenum chamber 35, is positioned in the side of the cylindrical valve opposite the opening 30 and serves as a supporting surface for material in valve chamber 32. The gas permeable member preferably is of tightly woven fabric, such as multiply canvas, and has a low gas permeability in order to promote uniform air distribution through the entire overlying bed of material. Air is supplied to the plenum chamber 35 by a conduit 36 passing into the valve body 24 through a hollow section of the valve shaft 25 in an airtight arrangement.

An opening 37 is formed in the bottom of valve body section 23$^b$ to permit removal of foreign material from the trap.

In operation of the material trap, the chamber within the housing is filled with the material to be conveyed in a preliminary operation, or, during the initial part of the conveying operation, the material being conveyed enters and fills the chamber. The material within the chamber, referred to as the fixed bed of material, rests upon the gas permeable medium 34 and air from the plenum chamber 35 is diffused through the medium 34 into the fixed bed in sufficient quantity and at the proper pressure to fluidize the bed. The bed fills the chamber and the top of the bed forms the support over which the material being conveyed travels across the trap.

The material being conveyed, containing foreign material, moves down the conveyor through the material conveying duct 16. The foreign material being carried in the moving stream is usually moving along the surface of the conveyor gas permeable medium 14 due to its density being greater than that of the particles of material being conveyed. When the foreign material moving along the conveyor 11 reaches the fluidized fixed bed of material in the trap, the foreign material, being heavier, will fall by gravity through the fluidized column to the surface of the gas permeable medium 34 of the rotary cylindrical valve 24, while the moving bed of material being conveyed will continue through the material conveying duct 16 toward the receiver 13. The foreign material which accumulates within the rotary cylindrical valve 24, or within that valve and the lower portion of housing 22 may be removed from the material trap, without interruption in the flow of the material being conveyed, by the rotation of the valve 24 one-half turn by means of the shaft 26 and the turning handle 29. This one-half turn will position the opening 30 of the valve plug in communication with the valve body opening 37, and permit the foreign material accumulated in the trap to be discharged therefrom by gravity. This rotation of the valve is only a momentary movement and the valve is immediately returned to its normal operating position for further accumulation of the foreign material being separated from the material being conveyed.

The efficiency of collection of my trap depends principally on first, the density of the foreign material; second, the degree of fluidization maintained in the fixed bed, which is measured by the bulk density of the fluidized material compared to its unaerated bulk density, third, the degree to which the material in the moving stream is aerated as it passes over the fluidized bed; and fourth, the length of the fluidized bed over which the moving stream passes. The properties of each material handled and particularly the particle size range will, as explained above, determine in each case the most desirable vertical gas velocity to maintain the fixed bed at a minimum bulk density. The moving stream as it passes over the fluidized bed should be aerated to the maximum possible extent without causing entrainment of the fines in the gas emerging from the top of the stream. The most desirable length for the trap is dependent on the first three items listed above, and on the efficiency of separation desired. I have found that in general, satisfactory separation is achieved by using a width approximating the width of the conveyor trough, and a length of approximately two feet. For example, traps varying in width from 6 to 16 inches and two feet in length have been effective when used with air gravity conveyors. In the case of screw conveyors, the length of the trap is with advantage made equal to about one to two screw flights. This length normally gives the gas sufficient time to penetrate the moving stream, and the foreign material sufficient time to drop into the trap.

The depth of the fluidized bed employed will be determined by the properties of the pulverulent material, the amount of foreign material to be collected, and the preferred frequency of removing the foreign material. I have found that in most cases a fluidized bed depth of twelve to eighteen inches is satisfactory.

The air requirement both as to volume and pressure, for operating the trap, is low. A small blower is normally satisfactory for the purpose, or in certain cases where the air-gravity conveyor is used, air may be supplied to the plenum chamber from the air chamber of the conveyor.

Pulverulent materials require vertical gas velocities of 0.05 to 0.3 foot per second, i. e., 3 to 18 C. F. M./sq. ft. of bed area to maintain maximum fluidization. Therefore, in carrying out the invention, using the disclosed apparatus, for the separation of foreign material from a raw cement mixture having a fineness of about 90% minus 200 mesh, 4 C. F. M./sq. ft. of air may be passed through the bed with a pressure of 28" w. g. (1 lb. p. s. i.) in the plenum chamber 35 of the rotary valve 24. This will cause fluidization of the material in the trap chamber T so that as the material flowing downwardly along the gas permeable member 14 of the conveying duct 11 passes over the trap chamber, foreign bodies carried along by it will drop out by gravity and accumulate in the bottom of the trap chamber from which they may periodically be discharged as described above.

This application is a division of my copending application Serial No. 261,874, filed December 15, 1951, and now Patent No. 2,769,544.

Various changes may be made in the specific form of the apparatus specifically described herein without departing from the invention or sacrificing any of the advantages thereof.

I claim:

1. Apparatus for separating foreign material from a moving stream of material comprising a conveyor trough along which the material is to be conveyed, a housing beneath the trough and having its upper end communicating with the trough for receiving material moving along the trough, said housing having an outlet opening at its lower side, a valve for controlling the discharge of material from the housing through said opening, said valve comprising a gas permeable member and a plenum chamber at one side of the gas permeable member, means for introducing a gas into said plenum chamber to flow through the gas permeable medium, the gas permeable medium, when said valve is in its normal position, closing the outlet opening from the housing to the discharge of material from the housing, and means for moving said valve to permit discharge of material from the housing.

2. Apparatus as defined in claim 1 in which the valve is a rotary one.

3. Apparatus as defined in claim 2 in which the valve comprises a hollow body and has an opening in the wall thereof, and the gas permeable medium and plenum chamber are secured to the wall of the hollow body diametrically opposite the opening in the wall.

4. Apparatus as defined in claim 3 in which the valve is of generally cylindrical form.

5. Apparatus for separating foreign material from a moving stream of material comprising a conveyor trough along which the material is to be conveyed, a housing beneath the trough and having its upper end communicating with the trough for receiving material moving along the trough, said housing having an outlet opening at its lower side, a valve body secured to the lower side of the housing, said valve body having an inlet opening at its upper side communicating with the opening in the bottom of the housing and a discharge opening in the lower side thereof, a valve in said valve body, means for selectively moving the valve to positions to shut off and to permit flow of material through the valve body, said valve including a gas-permeable medium and a plenum chamber at one side of the gas permeable medium, and means for introducing a gas into the plenum chamber to pass through the gas permeable medium and into the housing.

6. Apparatus as defined in claim 5 in which the valve is a rotary one.

7. Apparatus as defined in claim 6 in which the valve comprises a hollow body and has an opening in the wall thereof, and the gas permeable medium and plenum chamber are secured to the wall of the hollow body diametrically opposite the opening in the wall.

8. Apparatus as defined in claim 7 in which the valve is of generally cylindrical form.

9. In an apparatus for separating foreign material from a moving stream of material in a conveyor trough, a generally cylindrical container having inlet and outlet openings positioned beneath the trough and communicating therewith, a rotatable generally cylindrical receptacle having an inlet opening positioned within the container, a gas permeable wall positioned beneath the receptacle inlet opening, a plenum chamber directly beneath said gas permeable wall and forming a part of said rotatable cylindrical receptacle, and means for introducing a gas into said plenum chamber to pass through the gas permeable wall.

References Cited in the file of this patent

UNITED STATES PATENTS

| 1,534,846 | Fraser | Apr. 21, 1925 |
| 1,841,462 | Waxbom | Jan. 19, 1932 |
| 2,574,493 | McLean | Nov. 13, 1951 |